(12) United States Patent
Dong

(10) Patent No.: US 12,483,504 B2
(45) Date of Patent: Nov. 25, 2025

(54) WIRELESS COMMUNICATION METHOD AND APPARATUS FOR INDICATING TRANSMISSION PARAMETHER, COMMUNICATION DEVICE, AND STORAGE MEDIUM

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 410 days.

(21) Appl. No.: 18/013,235

(22) PCT Filed: Jul. 2, 2020

(86) PCT No.: PCT/CN2020/099921
§ 371 (c)(1),
(2) Date: Dec. 27, 2022

(87) PCT Pub. No.: WO2022/000421
PCT Pub. Date: Jan. 6, 2022

(65) Prior Publication Data
US 2023/0275831 A1    Aug. 31, 2023

(51) Int. Cl.
*H04L 45/74*     (2022.01)
*H04L 45/16*     (2022.01)
*H04W 52/02*    (2009.01)
*H04W 72/20*    (2023.01)
*H04W 72/30*    (2023.01)

(52) U.S. Cl.
CPC .............. *H04L 45/74* (2013.01); *H04L 45/16* (2013.01)

(58) Field of Classification Search
CPC ........ H04L 45/74; H04L 45/16; H04W 72/20; H04W 72/30; H04W 52/0216; Y02D 30/70
See application file for complete search history.

(56) References Cited

U.S. PATENT DOCUMENTS

| | | | | |
|---|---|---|---|---|
| 10,089,585 B1* | 10/2018 | Alexander | ....... | G06Q 10/06398 |
| 2003/0147387 A1* | 8/2003 | Devi | ...................... | H04L 49/351 |
| | | | | 370/396 |
| 2004/0057431 A1* | 3/2004 | Song | ....................... | H04L 12/18 |
| | | | | 370/390 |
| 2006/0020974 A1* | 1/2006 | Birnbaum | .......... | H04N 21/4431 |
| | | | | 725/50 |
| 2006/0176864 A1* | 8/2006 | Blasco Claret | ......... | H04L 61/35 |
| | | | | 370/432 |
| 2008/0123577 A1* | 5/2008 | Jaakkola | ............. | H04W 52/287 |
| | | | | 370/311 |
| 2008/0298294 A1* | 12/2008 | Gonsa | ................. | H04L 12/1886 |
| | | | | 370/312 |
| 2010/0220643 A1* | 9/2010 | Qi | ......................... | H04W 72/30 |
| | | | | 370/312 |

(Continued)

*Primary Examiner* — Jenee Holland
(74) *Attorney, Agent, or Firm* — Finnegan, Henderson, Farabow, Garrett & Dunner, L.L.P.

(57) ABSTRACT

A wireless communication method is performed by a first device, and includes: sending a first message frame carrying a flexible multicast service (FMS) descriptor element on a transmission link, wherein the FMS descriptor element at least comprises transmission parameters for transmitting FMS streams on a plurality of transmission links.

15 Claims, 5 Drawing Sheets

(56) References Cited

U.S. PATENT DOCUMENTS

| | | | |
|---|---|---|---|
| 2011/0141964 A1* | 6/2011 | Ai | H04L 41/044 |
| | | | 370/312 |
| 2012/0263086 A1* | 10/2012 | Liu | H04W 52/0229 |
| | | | 370/336 |
| 2014/0201212 A1* | 7/2014 | Qi | H04L 67/303 |
| | | | 707/741 |
| 2018/0302923 A1* | 10/2018 | Patil | H04W 68/005 |
| 2019/0200171 A1* | 6/2019 | Huang | H04W 4/06 |
| 2019/0200295 A1* | 6/2019 | Hartman | H04W 52/0222 |
| 2024/0031777 A1* | 1/2024 | Huang | H04W 4/06 |
| 2024/0214234 A1* | 6/2024 | Kwon | H04L 69/04 |

* cited by examiner

WIRELESS COMMUNICATION METHOD AND APPARATUS FOR INDICATING TRANSMISSION PARAMETHER, COMMUNICATION DEVICE, AND STORAGE MEDIUM

CROSS-REFERENCE TO RELATED APPLICATION

This application is a U.S. national phase application of International Application No. PCT/CN2020/099921, filed on Jul. 2, 2020, the content of which is hereby incorporated by reference in its entirety.

TECHNICAL FIELD

The disclosure relates to, but is not limited to, a field of wireless communication technologies, and in particular to a wireless communication method, a wireless communication apparatus, a communication device, and a storage medium.

BACKGROUND

In the 802.11be, Wireless Fidelity (Wi-Fi) will support the bandwidth up to 320 MHz, also support 240 MHz and the bandwidths supported by the 802.11ax.

The station in the power saving mode may obtain the downlink data through a message frame carrying a Traffic Indication Map (TIM) to obtain unicasted or multicasted data frames. In order to enable the station to save power more clearly, the way to obtain the multicast data may be the way of sending a flexible multicast service (FMS).

SUMMARY

A first aspect of the disclosure provides a wireless communication method, performed by a first device. The method includes: sending a first message frame carrying a flexible multicast service (FMS) descriptor element on one transmission link, in which the FMS descriptor element at least includes: transmission parameters for transmitting FMS streams on a plurality of transmission links.

A second aspect of the disclosure provides a wireless communication method performed by a second device. The method includes: receiving a first message frame on one transmission link, in which the first message frame carries a flexible multicast service (FMS) descriptor element and the FMS descriptor element includes at least transmission parameters for transmitting FMS streams on a plurality of transmission links.

A third aspect of the disclosure provides a communication device. The communication device includes a processor, a transceiver, and a memory storing a program executable by the processor, in which when the program is executed by the processor, the processor is configured to perform the wireless communication device according to the first aspect or the second aspect.

A fourth aspect of the disclosure provides a non-transitory computer storage medium, having an executable program stored thereon. When the executable program is executed by a processor, the wireless communication method according to the first aspect or the second aspect can be executed.

BRIEF DESCRIPTION OF THE DRAWINGS

The drawings herein are incorporated into the specification and constitute a part of the specification, show embodiments consistent with the disclosure, and are used together with the specification to explain the principle of the disclosure.

DETAILED DESCRIPTION

Here, embodiments will be described in detail, and examples thereof are shown in the accompanying drawings. When the following description refers to the drawings, unless otherwise indicated, the same numbers in different drawings indicate the same or similar elements. The implementation manners described in the following embodiments do not represent all implementation manners consistent with the disclosure. On the contrary, they are merely examples of devices and methods consistent with some aspects of the disclosure as detailed in the appended claims.

The terms used in embodiments of the disclosure are only for the purpose of describing particular embodiments, and are not intended to limit the embodiments of the disclosure. As used in the embodiments of the disclosure and the appended claims, the singular forms "a" and "the" are intended to include the plural forms as well, unless the context clearly dictates otherwise. It is also understandable that the term "and/or" as used herein refers to and includes any and all possible combinations of one or more of the associated listed items.

It is understandable that although the terms "first," "second," "third," etc. may be used in embodiments of the disclosure to describe various pieces of information, such information is not be limited to these terms. These terms are only used to distinguish the same type of information from each other. For example, without departing from the scope of the embodiments of the disclosure, the first information may also be referred to as the second information, and similarly, the second information may also be referred to as the first information. Depending on the context, the words "if" as used herein can be interpreted as "at the time of" or "when" or "in response to determining."

In order to better describe embodiments of the disclosure, in an embodiment of the disclosure, the application scenario of an intelligent electric meter control system is taken as an example for illustrative description.

Figure 1:
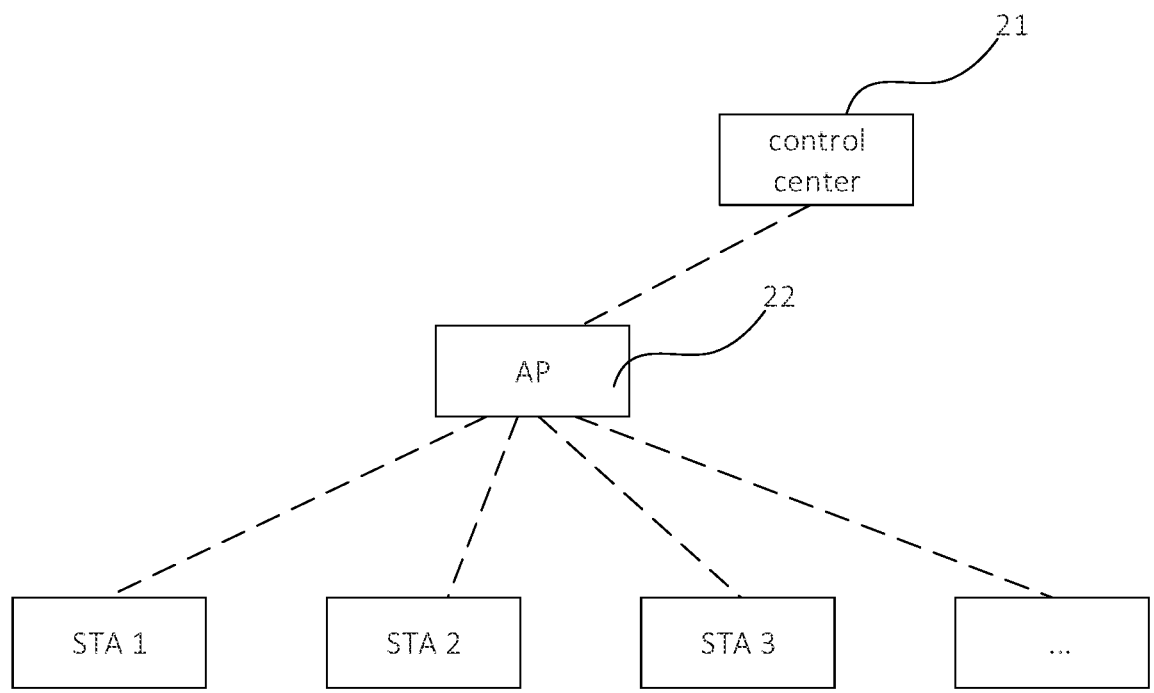
FIG. 1 is a schematic diagram illustrating a structure of a wireless communication system according to some embodiments.

As illustrated in FIG. 1, an embodiment of the disclosure provides a wireless communication system. The wireless communication system includes a control center 21, an access point 22, a station (STA) 1, a station 2, a station 3 and other stations. It is noteworthy that the control center 21 may be an intelligent gateway. An access point 22 can be a router. According to the scheduling requirements of the intelligent control system, the intelligent gateway can send a scheduling instruction to the access point 22 to instruct the access point 22 to configure buffered data stored in the AP to the STAs. Here, in order to save power, the STAs may be in a dormant state, but the STAs in the dormant state still need to acquire the buffered data from the access point 22 to execute corresponding application functions in real time.

Figure 2:
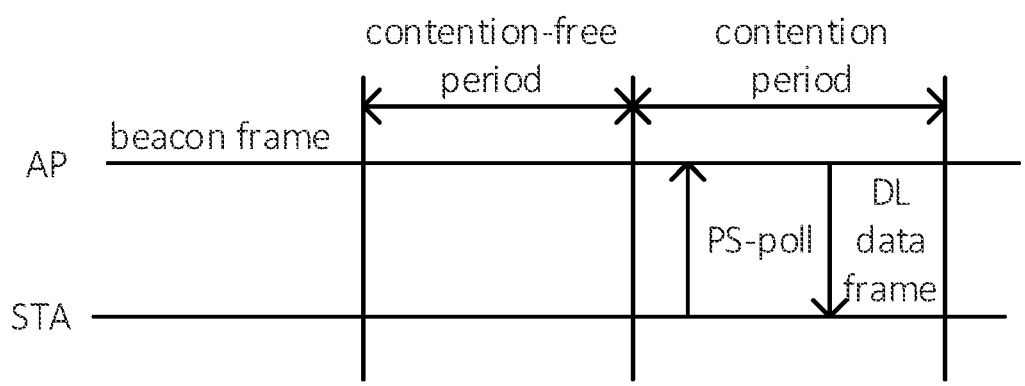
FIG. 2 is a flowchart illustrating the communication between a station and an access point according to some embodiments.

FIG. 2 is a schematic diagram illustrating a method that an STA in a dormant state obtains buffered data according to some embodiments of the disclosure. As illustrated in FIG. 2, before entering the dormant state, the STA may negotiate a wake-up cycle with the access point to listen on a beacon frame. The STA will wake up periodically to listen on the beacon frame sent by the access point (AP), and analyze the Traffic Indication Map (TIM) to know whether the access point has buffered a downlink transmission for the STA. If the access point has buffered the downlink transmission for the STA, the STA sends a power saving poll (PS-poll) frame during the contention period to obtain resources to receive the downlink data buffered by the access point. Here, there are two ways to send the PS-poll frame.

The first way: the STA sends the PS-poll frame on the link of receiving the beacon frame, and synchronously receives in parallel the buffered downlink transmission on multiple transmission links.

The second way: the STA sends respective PS-poll frames on all links respectively and receives the buffered downlink transmission separately on each link. In this way, the time of receiving the buffered downlink transmission on different links can be the same or different. The frequencies used by the multiple transmission links are different, for example, the frequencies used by the multiple transmission links may be one or more of 2.4 GHz, 5.8 GHz, and 6-7 GHz.

Figure 3:
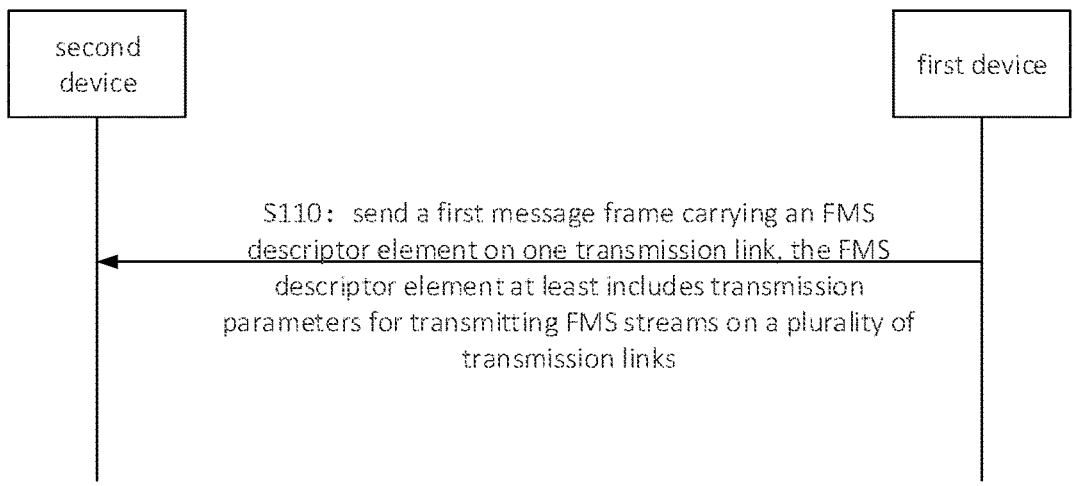
FIG. 3 is a flowchart illustrating a wireless communication method according to some embodiments.

As illustrated in FIG. 3, embodiments of the disclosure provide a wireless communication method executed by a first device. The method includes the following.

At block S110: a first message frame carrying an FMS descriptor element is sent on one transmission link. The FMS descriptor element at least includes: transmission parameters for transmitting FMS streams on multiple transmission links.

The "first device" mentioned here may be an access point (AP). Some stations (STA) each supports establishing multiple transmission links with an access point at the same time. If these transmission links are all used for transmitting data at the same time, the data transmission can be accelerated and the data transmission bandwidth can be increased.

The second device can be a station and specifically be an intelligent home appliance such as an intelligent electric meter or an intelligent water meter. Certainly, in other embodiments, the station may also be a device, such as an intelligent office device or an intelligent access control device. The second device may also be a smart device such as a smartphone.

The "first message frame" mentioned here may carry transmission parameters for transmitting the FMS streams on at least two transmission links. Certainly, if the first device needs to transmit the FMS stream on one transmission link, the first message frame may carry only the transmission parameter of the FMS stream of the one transmission link through the FMS descriptor element. The transmission parameters may be sent to the second device.

The FMS stream may include a series of consecutively transmitted data packets. For example, transmitting the FMS stream may include transmitting a series of consecutively buffered data packets.

The first message frame may be any type of control frames or message frames. As an example, the first message frame may be a beacon frame. For example, the beacon frame can be, but is not limited to, a Delivery Traffic Indication Map (DTIM) beacon frame. The DTIM in the DTIM beacon frame may use a form of bitmap to indicate which transmission links have buffered data packets to be transmitted. After receiving the DTIM beacon frame, the second device can transmit the buffered data to be transmitted at a time interval corresponding to the DTIM.

The first message frame can be any broadcasted message frame. For example, the first message frame can be a broadcasted beacon frame. In this way, multiple second devices that need to receive the FMS streams can receive the first message frame so that each second device knows whether each of its transmission links has an FMS stream to be received.

If the DTIM beacon frame carries the FMS descriptor element, the second device wakes up based on the transmission parameters of the FMS streams carried by the FMS descriptor element to receive the FMS streams. The transmission intervals (or referred to as the transmission periods) of the FMS streams indicated by the FMS descriptor element may be longer than the time interval indicated by the DTIM, such that the second device may further save power.

The "FMS stream" mentioned here is a data stream transmitted by an FMS service. The FMS service is flexible multicast service which is a service that the STA can transmit data at a transmission interval longer than the transmission interval indicated by the DTIM. This FMS service can further extend the duration that the STA is in the power saving state, thereby further reducing the power consumption for the STA and prolong the standby time of the STA.

The FMS descriptor element has a predetermined information format. After the information format is extended, transmission parameters of the FMS streams of different transmission links can be indicated.

In embodiments of the disclosure, the FMS descriptor element may carry the transmission parameter per transmission link. Therefore, the transmission parameters of multiple transmission links may be transmitted on one transmission link. After receiving one FMS descriptor element on one transmission link, the second device can know the specific transmission links to which the data transmission parameters carried by the FSM descriptor element belong. In this way, neither the first device nor the second device needs to transmit the transmission parameters of the FMS streams of the transmission links respectively on these transmission links.

For example, there are N transmission links between the first device and the second device. If the first message frame is received on the $m^{th}$ transmission link, the first message frame includes not only transmission parameter of the FMS stream of the $m^{th}$ transmission link, but also transmission parameters of FMS streams of other transmission links. The "transmission parameter" mentioned here includes, but is not limited to, a transmission period. For example, one or more transmission parameters may include start time of transmissions of one or more FMS streams. Both N and m are positive integers and m is a positive integer less than or equal to N.

The data transmitted through the FMS stream may be data buffered by the first device for the second device. For example, the data frames transmitted through the FMS stream are buffered units (BU) that are buffered in the first device in advance and is to be sent to the second device.

In some embodiments, the FMS descriptor element at least includes link identifiers configured to identify the plurality of transmission links.

The link identifiers are introduced into the FMS descriptor element, such that one FMS descriptor element can carry transmission parameters of FMS streams of the plurality of transmission links.

The FMS descriptor element may also include at least one configuration parameter of at least one of the plurality of transmission links.

In one embodiment, one FMS counters field corresponds to one transmission link identifier. In another embodiment, a plurality of FMS counters fields correspond to one transmission link identifier, and the plurality of FMS counters fields corresponding to the same transmission link identifier are transmission fields of FMS streams transmitted on the same transmission link.

In one embodiment, one FMS counters field corresponds to one FMS stream. That is, one FMS counter corresponds to the transmission parameter of one FMS stream.

By carrying the link identifiers, on the one hand, the specific transmission links to which the transmission parameters of the FMS stream respectively belong can be determined. On the other hand, by carrying the link identifiers, it is possible to carry only transmission parameters of some transmission links that each has a requirement of transmitting the FMS stream, and not carry transmission parameters of transmission links that each does not have the requirement of transmitting FMS stream. Therefore, the frame length of the first message frame is shortened and unnecessary bit overhead is saved.

In another embodiment, the FMS descriptor element may not carry the above-mentioned link identifiers. Instead, the transmission parameters of the FMS streams of all transmission links between the first device and the second device are carried, according to a predetermined order of the transmission links, in the FMS descriptor element of the first message frame. In this way, if there is no FMS stream to be transmitted on one transmission link, the bits corresponding to the transmission parameter of that transmission link equal to preset values. For example, all bits equal to "0" or all bits equal to "1".

In some embodiments, the FMS descriptor element may include at least one configuration parameter of at least one of the plurality of transmission links.

Each configuration parameter can include an FMS counters field configured to indicate one or more transmission periods of one or more FMS streams through one or more counts of beacon frames received by a second device.

For example, if an FMS counter equals to M, after receiving the first message frame, the second station may receive an FMS stream corresponding to the FMS descriptor element on a corresponding transmission link after an interval of M beacon frames.

The first device periodically broadcasts the beacon frames, such that the second device can periodically receive the beacon frames. The second device can count the received beacon frames, and if the count number reaches a maximum count value of an FMS counter, it can be determined that the timing for receiving the FMS stream has arrived, and according to the transmission parameter of the FMS stream carried by the FMS descriptor element, the FMS stream is received on the transmission link.

In some embodiments, different FMS streams may share one FMS counter, or different FMS streams may use different FMS counters.

In some embodiments, the FMS counters field includes at least one of the following: one or more FMS counter identifiers (ID) configured to identify one or more FMS counters; or one or more current counts each configured to indicate the number of beacon frames that appear before a next beacon frame that triggers the transmission of the FMS stream.

The FMS counters field includes a current FMS counter identifier configured to indicate a corresponding FMS counter. After knowing the FMS counter ID, the second device can start the FMS counter correspondingly. For example, FMS counters with different count values may be known in advance between the first device and the second device, and then the first device may directly send the FMS counter ID.

Certainly, in other embodiments, the count value of each FMS counter can be carried in the FMS counters field. In this way, after the second device receives the FMS counters field, the second device directly receives the beacon frames that is sent by the first device and received by the second device itself according to the count value to realize the determination of the transmission interval (also called transmission period) of the FMS stream.

In a word, after receiving the FMS counters field, the second device directly determines the transmission interval (or transmission periods) of the FMS stream by receiving, by the second device itself based on the information in the counter field, the beacon frames sent by the first device.

The current count indicates the number of beacon frames transmitted before the next beacon frame that triggers the transmission of the FMS stream appears, and the second device determines, based on the current count, the beacon frame on which the transmission of the FMS stream is triggered.

The current count is to indicate the number of beacon frames that do not trigger the transmission of the FMS stream between two adjacent beacon frames that trigger the transmission of the FMS stream.

A currently received beacon frame is considered in the counting while the number of beacon frames is being counted. For example, the first message frame is also a beacon frame that triggers the transmission of the FMS stream and while the second device is counting the number of beacon frames according to the current count, the first message frame is also taken into the counting.

The beacon frame that can trigger the transmission of the FMS stream can be, but is not limited to, a DTIM beacon frame. The DTIM beacon frame is a beacon frame carrying the DTIM.

In some embodiments, the FMS descriptor element may further include at least one of the following: a numbers of FMS counters field configured to indicate the number of the FMS counters fields; an FMS identifiers field including one or more FMS identifiers, in which each FMS identifier is configured to identify a respective FMS stream; and a time offset field carrying time offsets indicating sending timing of beacon frames on the plurality of transmission links.

The number of FMS counters fields is equal to the number of FMS counters of the FMS streams of the second device. Therefore, in embodiments of the disclosure, the number of FMS counters field is introduced to indicate the number of the FMS counters, which is convenient for the second device to decode the FMS descriptor element.

The sending timing of beacon frames on different transmission links may be the same or different. In some examples, the time offsets carried in the time offset field facilitate the second device to shift the sending timing of the beacon frame on the first transmission link to determine the sending timing of the beacon frames on the multiple transmission links between the second device and the first device, so as to facilitate determining by the second device, the receiving time moments of the beacon frames sent by the first device.

One time offset field can carry one time offset, and one time offset field corresponds to one FMS counters field and one transmission link. In the FMS descriptor element, the FMS counters field and the time offset field of one transmission link are adjacent to the end of the link identifier of that transmission link.

In some embodiments, the FMS descriptor element may further include an element identifier configured to determine whether the FMS descriptor element includes the transmission parameters of the FMS streams of the plurality of transmission links.

In some embodiments, the FMS descriptor element may only carry the transmission parameter of the FMS stream of one transmission link. In order to distinguish two kinds of FMS descriptor elements, different element identifiers may be set for these two kinds of FMS descriptor elements, so that the second device can know whether the currently received FMS descriptor element contains the transmission parameters of the FMS streams of multiple transmission links by decoding the element identifier.

For example, the element identifier of the FMS descriptor element may be carried by one or more bits. If the element identifier is carried by one bit, the two bit values of the one bit can identify the FMS descriptor element that only carries the transmission parameter of the FMS stream of one transmission link and the FMS descriptor element that carries the transmission parameters of the FMS streams of multiple transmission links respectively.

In embodiments of the disclosure, the FMS descriptor element that carries the transmission parameters of multiple FMS streams may be shown in Table 1, but is not limited to Table 1.

Figure 4:
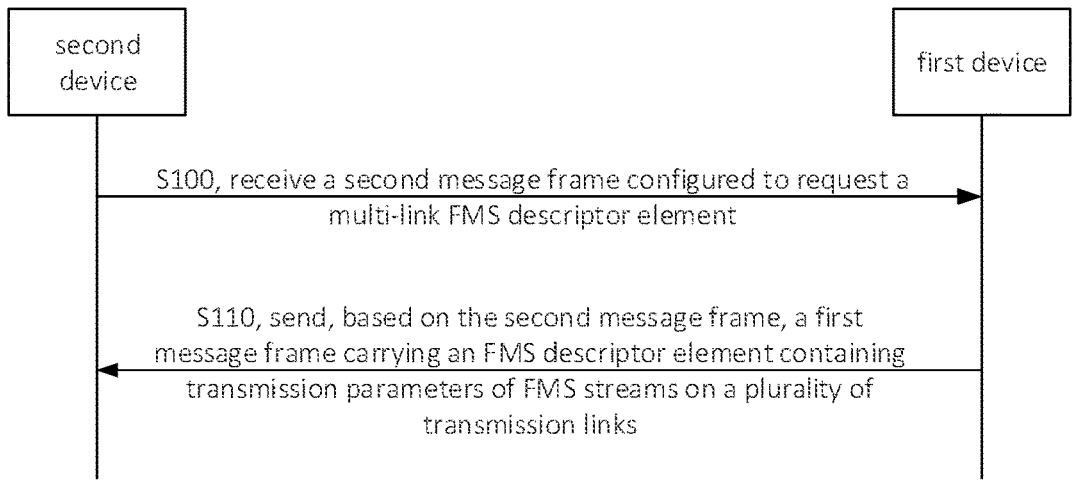
FIG. 4 is a flowchart illustrating a wireless communication method according to some embodiments.

As illustrated in FIG. 4, the method further includes the following.

At block S100, a second message frame is received. The second message frame is configured to request a multi-link FMS descriptor element.

The block S110 may include: sending, based on the second message frame, the first message frame carrying the FMS descriptor element containing transmission parameters of FMS streams of the plurality of transmission links.

In some embodiments, the second message frame may be any type of control frames or data frames. For example, the second message frame is, but is not limited to, an FMS request frame. The FMS request frame carries a request for an FMS descriptor element.

In some embodiments, the second message frame also carries an FMS request element. The FMS request element carries suggested parameters for transmitting the FMS streams for the second device. The transmission parameters of the FMS streams carried by the FMS descriptor element in the first message frame are determined by the first device according to the suggested parameters.

Certainly, in other embodiments, the first message frame may also be actively sent by the AP, which does not necessarily need to be triggered by the second message frame. For example, the AP adjusts the transmission parameters of the FMS streams of the one or more transmission links on the AP according to the number of STAs connected to the AP and/or the communication status between multiple STAs and the AP. At this time, the AP can actively send the first message frame to notify the corresponding STA of the change of transmission parameters of the FMS streams of one or more transmission links. The transmission parameter here includes but is not limited to: a transmission period.

For example, the second device may detect the wireless environment where it is located, and provide the first device with suggested parameters for transmitting the FMS streams through the FMS request element carried in the second message according to the wireless environment detected by the second device itself. After receiving the second message frame, according to the suggested parameter for transmitting the FMS streams carried in the second message and the wireless environment detected by the first device and/or a

TABLE 1

| Element identifier (ID) | Length | Link identifier: Link 1 | Numbers of FMS counters field | FMS Counters | FMS identifiers (IDs) field | Link identifier: Link 2 | . . . |
| --- | --- | --- | --- | --- | --- | --- | --- |

The FMS descriptor element that carries the transmission parameter of one FMS stream in the related art may be as shown in Table 2.

TABLE 2

| Element identifier (ID) | Length | Numbers of FMS counters field | FMS Counters | FMS identifiers (IDs) |
| --- | --- | --- | --- | --- |

The data format of the FMS counters field in Tables 1 and 2 can be shown in Table 3.

TABLE 3

| FMS Counter ID | Current Count |
| --- | --- | transmission load of the first device, the first device determines the first message frame carrying the transmission parameters for scheduling the FMS streams by the first device that is sent by the first device to the second device through the FMS descriptor element. By sending the second message frame, the second device can receive transmission parameters of the FMS streams that are more in line with its own wireless environment and/or load conditions, thereby ensuring the transmission quality of the FMS stream.

The "second message frame" mentioned here may be: an FMS request frame and/or an association request frame. The FMS request frame may be a request frame that is dedicated to requesting the FMS descriptor element. The association request frame may be a frame for requesting to establish an association by the second device with the first device through one or more transmission links. By carrying an FMS request element for requesting the transmission parameters of the FMS streams in the association request frame, after the association between the first device and the second device is established, the first message frame can be immediately sent to the second device through one of the established transmission links, such that the second device can obtain the transmission parameters of the FMS streams of one or more transmission links in time.

Table 4 shows the data format of the FMS request element.

TABLE 4

| Element identifier (ID) | Length | FMS token | FMS Request Subelement field |
|---|---|---|---|

The length of the FMS request subelement is changeable. The FMS request subelement may carry the suggested parameters for transmitting the FMS streams that are suggested by the first device.

Figure 5:
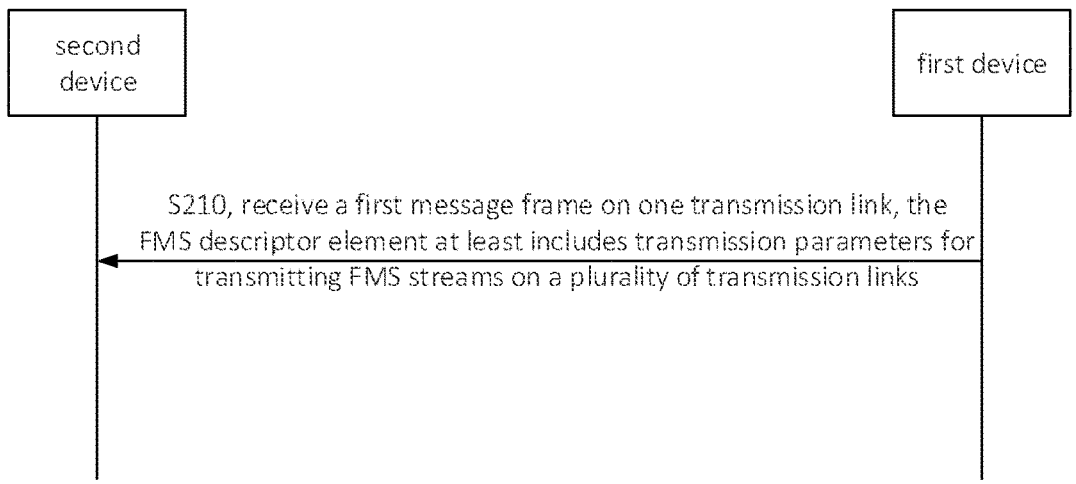
FIG. 5 is a flowchart illustrating a wireless communication method according to some embodiments.

As illustrated in FIG. 5, embodiments of the application provides a wireless communication method performed by a second device. The method includes the following.

At block S210, a first message frame is received on one transmission link. The FMS descriptor element at least includes transmission parameters for transmitting FMS streams on a plurality of transmission links.

The "second device" mentioned here may be: a station (STA).

The second device can be any Wi-Fi device that supports multiple links.

The transmission parameters of the FMS streams of the plurality of transmission links are transmitted on one transmission link, so that after receiving the first message frame on one transmission link, the second device can know the transmission parameters of the FMS streams of the plurality of transmission links, without the need of separately receiving the transmission parameters of the FMS streams of respective transmission links on corresponding transmission links, thereby reducing the power consumption of the second device caused by receiving separately the transmission parameters of the FMS streams on the plurality of transmission links and prolonging the standby time of the second device.

It is noteworthy that the "first message frame" mentioned here may be the aforementioned beacon frame. The beacon frame may be a broadcasted beacon frame. The beacon frame may be a DTIM beacon frame carrying the DTIM. At this time, the second device receives the first message frame via broadcast.

In some embodiments, the method may further include receiving FMS streams sent by the first device on the plurality of transmission links based on the first message frame.

Since the FMS descriptor element contained in the first message frame has the transmission parameters of FMS streams of the plurality of transmission links, the FMS streams are received on the plurality of transmission links according to a single message frame.

In some embodiments, the FMS descriptor element at least includes link identifiers configured to identify the transmission links.

In embodiments of the disclosure, the FMS descriptor element carries the link identifiers of the transmission links respectively corresponding to the transmission parameters. By introducing the link identifiers in the FMS descriptor element, one FMS descriptor element can be used to carry the transmission parameters of the FMS streams of different transmission links and can be used to distinguish the transmission links corresponding to different transmission parameters carried in the same FMS descriptor element.

In one embodiment, the transmission parameter at least includes a transmission interval or a transmission period, which is carried in an FMS counters field.

In some embodiments, the FMS descriptor element may further include at least one configuration parameter of at least one of the plurality of transmission links.

Each configuration parameter may include an FMS counters field configured to indicate the transmission period of the FMS stream through a count of beacons received by a second device.

In some embodiments, the FMS counters field may include at least one of the following: an FMS counter identifier (ID) configured to identify the FMS counter; or a current count configured to indicate the number of beacon frames that appear before a next beacon frame that triggers the transmission of the FMS stream.

For the relevant descriptions of the FMS counters field, the FMS counter ID, and the current count, reference may be made to the relevant parts of the foregoing embodiments, which will not be repeated here.

In some embodiments, the FMS descriptor element may further include at least one of the following: a numbers of FMS counters field configured to indicate the number of the FMS counters fields; an FMS identifiers field including one or more FMS identifiers, in which each FMS identifier is configured to identify a respective FMS stream; and a time offset field carrying time offsets indicating sending timing of beacon frames on the plurality of transmission links.

Similarly, for the relevant descriptions of the numbers of FMS counters field, the FMS identifiers field and the time offset field, reference may be made to the relevant parts of the foregoing embodiments, which will not be repeated here.

After receiving the FMS descriptor element, the second device can decode the above-mentioned transmission parameters according to the data format of the FMS descriptor element; and transmit the FMS streams according to the decoded transmission parameters.

In some embodiments, the FMS descriptor element may further include: an element identifier configured to determine whether the FMS descriptor element includes the transmission parameters of the FMS streams on the plurality of transmission links.

In the related art, one FMS descriptor element carries the transmission parameter of the FMS stream of one transmission link, while in the disclosure, one FMS descriptor element carries the transmission parameters of the FMS streams of the plurality of transmission links. Therefore, in order to distinguish these two types of FMS descriptor elements, element identifiers can be set for these two types of FMS descriptor elements. Therefore, after receiving the element identifier in the first message frame, the second device may know the type of the FMS descriptor element in the first message frame and know whether the transmission parameter(s) of the FMS descriptor element belong to one transmission link or a plurality of transmission links. Introducing the element identifier in the first message frame can facilitate decoding by the second device.

Figure 6:
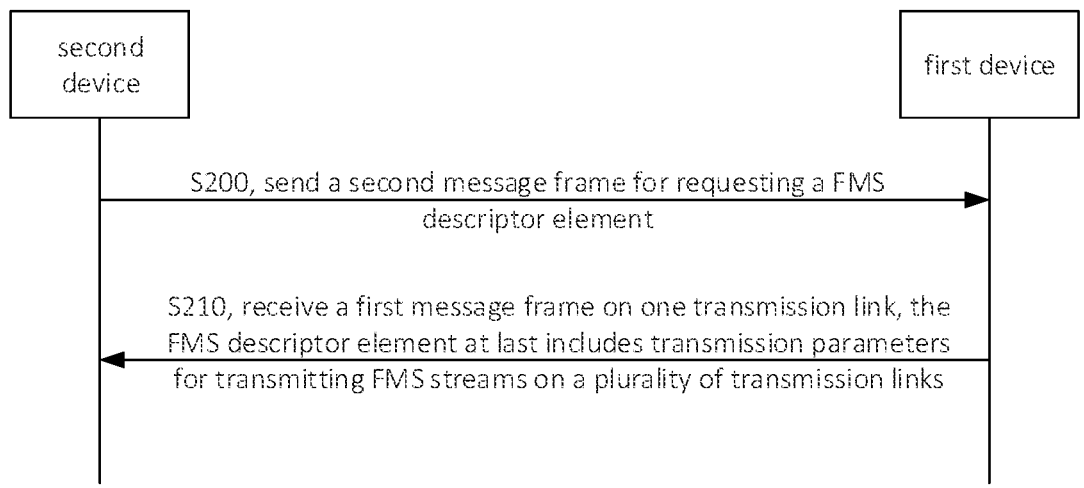
FIG. 6 is a flowchart illustrating a wireless communication method according to some embodiments.

In some embodiments, as illustrated in FIG. 6, the method further includes the following.

At block S200, a second message frame for requesting an FMS descriptor element is sent. The FMS descriptor element at least includes transmission parameters for transmitting FMS streams on a plurality of transmission links. The first message frame is sent based on the second message frame.

The "second message frame" mentioned here may be an FMS request frame and/or an association request frame. The FMS request frame may be a frame that is dedicated to requesting the FMS descriptor element.

The association request frame may be a frame for requesting to establish an association between the second device with the first device through one or more transmission links.

By carrying the FMS request element for requesting the FMS descriptor element in the association request frame, after the association between the first device and the second device is established, the first message frame can be immediately sent to the second device through one of the established transmission links, such that the second device can obtain the transmission parameters of the FMS streams on one or more transmission links in time.

For example, the second device may detect the wireless environment where it is located, and provide the first device with suggested parameters for transmitting the FMS streams through the FMS request element carried in the second message according to the wireless environment detected by the second device itself. After receiving the second message frame, according to the suggested parameter for transmitting the FMS streams carried in the second message and the wireless environment detected by the first device and/or a transmission load of the first device, the first device determines the first message frame carrying the transmission parameters for scheduling the FMS streams by the first device that is sent by the first device to the second device through the FMS descriptor element. By sending the second message frame, the second device can receive transmission parameters of the FMS streams that are more in line with its own wireless environment and/or load conditions, thereby ensuring the transmission quality of the FMS stream.

In one embodiment, the frequency band range of the next-generation mainstream wireless fidelity (Wi-Fi) technologies, such as 802.11 a/b/g/n/ac, is 320 MHz bandwidth transmission, and aggregation and coordination of multiple frequency bands are focused on. The proposed vision is to increase the speed and throughput by at least four times compared to the existing 802.11 ax. Its main application scenarios are video transmission, augmented reality (AR) or virtual reality (VR).

The aggregation and collaboration of multiple frequency bands refers to communicating between devices in all of the 2.4 GHz, 5.8 GHz and 6-7 GHz frequency bands at the same time. The communication between devices in multiple frequency bands at the same time need to define a new Media Access Control (MAC) mechanism for management. Another vision of EE802.11 be is to support low-latency transmission.

As an example, the AP broadcasts the FMS descriptor element in the beacon frame.

As another example, the station sends the FMS request frame or carries the FMS request element in the association request frame, and the AP replies the association response frame carrying the FMS descriptor element as the response element of the FMS request element.

On one transmission link of one station, indication information indicating that data is buffered on multiple other enabled transmission links can be received.

In embodiments of the disclosure, the FMS stream transmitted by the FMS mechanism is further enhanced, so that the device can obtain, on any link, transmission periods for the multicast data frames in the buffered FMS streams on other links. The device can save more power. The multicast data frames may be buffered data frames buffered by the AP for the STA.

The FMS descriptor element is defined to identify the DTIM for other links, so that the STA operates internally and can know the buffer units (BU) of other links. One or more BUs constitute the aforementioned buffered data frame.

The relevant descriptions of the FMS descriptor element can be as follows.

The FMS descriptor element includes link identifiers and indicates the periods that the AP will send the buffered multicast data frames on respective transmission links, as shown in Table 1, and the data format of the FMS counters field can be shown in Table 2.

The link identifiers identify the links supported by the AP.

The number of FMS counters field indicates how many FMS counters fields are included in the FMS descriptor element.

The FMS counters field is used by the station to confirm the sending interval of the buffered multicast data frame after the transmission of the DTIM beacon frame. The sending interval here may also be referred to as a sending period.

The FMS counter ID indicates an ID assigned by the AP to an FMS stream.

The current count indicates the number of DTIM beacon frames that appear before a next specific FMS DTIM beacon frame. The specific FMS DTIM beacon frame here is the DTIM beacon frame that triggers the transmission of the FMS streams.

The FMS descriptor frame is encapsulated in the beacon frame broadcast by the AP. It needs to identify through the element ID whether the FMS descriptor element is suitable for multi-link.

After receiving the FMS descriptor element broadcast by the AP in the beacon frame, the station that has established an association with the AP determines the buffered data frames that need to be accepted by the station according to the FMS counter ID assigned by the AP, as well as the buffered data frames of other links which also needs the FMS counter IDs assigned by the AP), and starts counting the beacon frames transmitted through the FMS streams.

After receiving the FMS descriptor element broadcasted by the AP, the station that does not establish an association with the AP can negotiate with the AP on whether to accept the buffered data frames of each transmission link.

If the beacon frame transmitted on each transmission link carries the time offset indicating the sending timing of the beacon frame by the AP on each transmission link relative to the sending timing of one transmission link, the station that has not established an association with the AP can negotiate with the AP on the mechanism for receiving buffered data frames on one transmission link; and the station that has established an association with the AP can wake up upon receiving the DTIM beacon frame to receive the data frame.

This enables the station to know the multicast service interval of other links through one transmission link, which is beneficial to the further power saving of the device.

Figure 7:
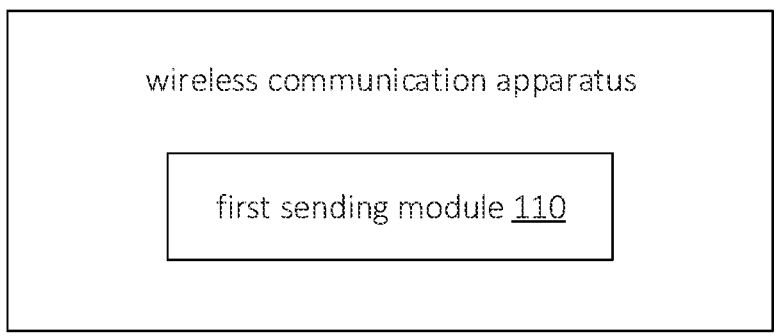
FIG. 7 is a schematic diagram illustrating a wireless communication apparatus according to some embodiments.

As illustrated in FIG. 7, embodiments of the disclosure provide a wireless communication apparatus applied to a first device. The apparatus includes the following.

A first sending module 710 is configured to send a first message frame carrying a flexible multicast service (FMS) descriptor element on one transmission link. The FMS descriptor element at least includes transmission parameters for transmitting FMS streams on a plurality of transmission links.

In some embodiments, the first sending module 710 may be a program module. After the program module is executed by a processor, the program module can send, on one transmission link, the first message frame carrying transmission parameters for transmitting FMS streams on the plurality of transmission links.

In other embodiments, the first sending module 710 may further include a module including both the software and the hardware. The software-hardware combined module includes but is not limited to various programmable arrays. The programmable arrays include but are not limited to: field programmable arrays and/or complex programmable arrays.

In still other embodiments, the first sending module 710 further includes: pure hardware modules such as application specific integrated circuits.

In some embodiments, the FMS descriptor element at least includes link identifiers configured to identify the transmission links.

In some embodiments, the FMS descriptor element includes an FMS counters field configured to indicate the transmission period of the FMS stream through a count of beacons received by a second device.

In some embodiments, the FMS counters field may include at least one of the following: an FMS counter identifier (ID) configured to identify the FMS counter; or a current count configured to indicate the number of beacon frames that appear before a next beacon frame that triggers the transmission of the FMS stream.

In some embodiments, the FMS descriptor element may further include at least one of the following: a numbers of FMS counters field configured to indicate the number of the FMS counters fields; an FMS identifiers field including one or more FMS identifiers, in which each FMS identifier is configured to identify a respective FMS stream; and a time offset field carrying time offsets indicating sending timing of beacon frames on the plurality of transmission links.

In some embodiments, the FMS descriptor element further includes: an element identifier configured to indicate whether the FMS descriptor element includes transmission parameters of FMS streams of the plurality of transmission links.

In some embodiments, the apparatus further includes: a first receiving module configured to receive a second message frame. The second message frame is configured to request a multi-link flexible multicast service (FMS) descriptor element.

Figure 8:
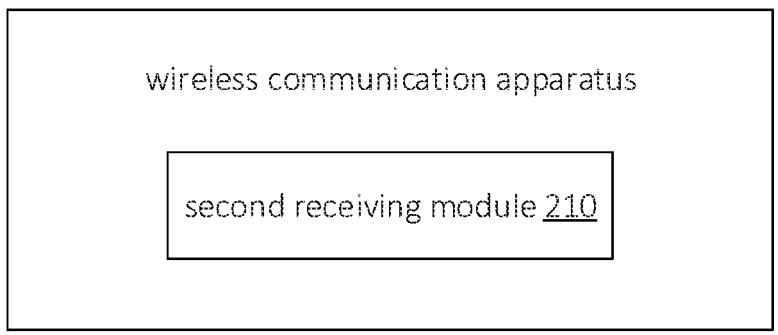
FIG. 8 is a schematic diagram illustrating a wireless communication apparatus according to some embodiments.

As illustrated in FIG. 8, embodiments of the disclosure provide a wireless communication apparatus applied in a second device. The apparatus includes a second receiving module 210.

The second receiving module 210 is configured to receive a first message frame on one transmission link. The first message frame carries an FMS descriptor element. The FMS descriptor element at least includes: transmission parameters for transmitting FMS streams on a plurality of transmission links.

In some embodiments, the second receiving module 210 may be a program module. After the program module is executed by a processor, the first message frame carrying the transmission parameters for transmitting the FMS streams on the plurality of transmission links is received on one transmission link.

In other embodiments, the first sending module may further include a module including both the software and the hardware. The software-hardware combined module includes but is not limited to various programmable arrays. The programmable arrays include but are not limited to: field programmable arrays and/or complex programmable arrays.

In some embodiments, the second receiving module 210 is further configured to receive, based on the first message frame, the FMS streams sent by the first device on the plurality of transmission links.

In some embodiments, the FMS descriptor elements may at least includes link IDs configured to identify the transmission links.

In some embodiments, the FMS descriptor element may further include an FMS counters field configured to indicate the transmission period of the FMS stream through a count of beacons received by a second device.

In some embodiments, the FMS counters field may include at least one of the following: an FMS counter identifier (ID) configured to identify the FMS counter; or a current count configured to indicate the number of beacon frames that appear before a next beacon frame that triggers the transmission of the FMS stream.

In some embodiments, the FMS descriptor element may further include at least one of the following: a numbers of FMS counters field configured to indicate the number of the FMS counters fields; an FMS identifiers field including one or more FMS identifiers, in which each FMS identifier is configured to identify a respective FMS stream; and a time offset field carrying time offsets indicating sending timing of beacon frames on the plurality of transmission links.

In some embodiments, the FMS descriptor element further includes: an element identifier configured to indicate whether the FMS descriptor element includes transmission parameters of FMS streams of the plurality of transmission links.

In some embodiments, the apparatus further includes a second sending module.

The second sending module is configured to send a second message frame configured to request the FMS descriptor element.

Embodiments of the disclosure provide a communication device. The communication device includes a processor, a transceiver, a memory, and a program stored on the memory and executable by the processor. When the processor executes the program, the wireless communication method executed by the second device according to any of the foregoing technical solutions or the wireless communication method executed by the first device according to any of the foregoing technical solutions is executed.

The communication device may be the aforementioned first device or the second device.

The processor may include various types of storage media, which are non-transitory computer storage media that can continue to memorize and store information on the communication device after the power is turned off. Here, the communication device includes a first device or user equipment.

The processor may be connected to the memory through a bus or the like, for reading the executable program stored on the memory, for example, as illustrated in at least one of FIG. 3 to FIG. 6.

Embodiments of the disclosure provide a computer storage medium, having an executable program stored therein. After the executable program is executed by a processor, the method according to any technical solution of the first aspect or the second aspect can be implemented, For example, as illustrated in at least one of FIGS. 3 to 6.

Figure 9:
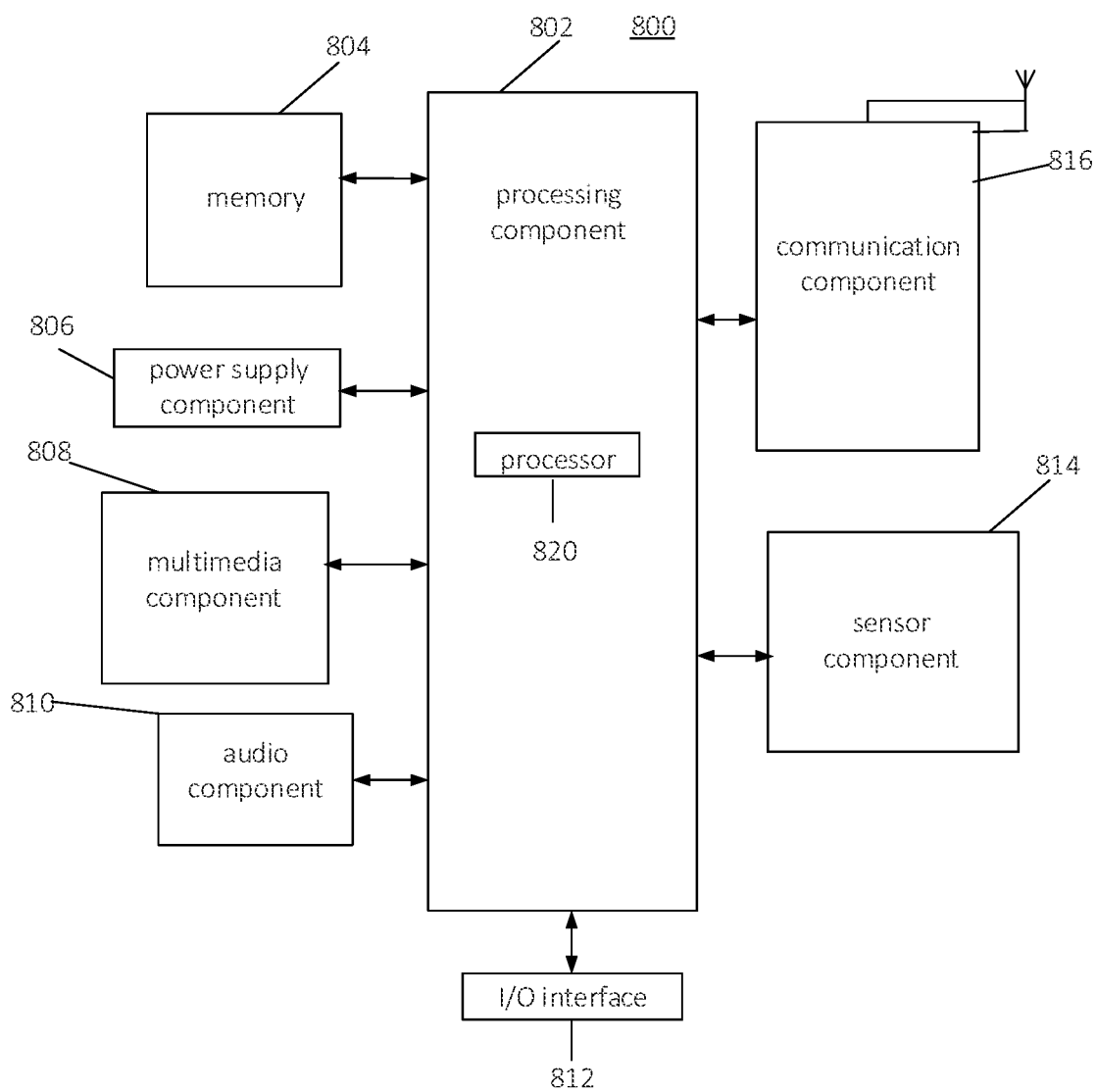
FIG. 9 is a schematic diagram illustrating a second device according to some embodiments.

FIG. 9 is a block diagram illustrating a second device 800 according to some embodiments. For example, the second device 800 may be a mobile phone, a computer, a digital broadcast user equipment, a messaging device, a game console, a tablet device, a medical device, a fitness device, a personal digital assistant, and the like.

As illustrated in FIG. 9, the second device 800 may include at least one of the following components: a processing component 802, a memory 804, a power supply component 806, a multimedia component 808, an audio component 810, an input/output (I/O) interface 812, a sensor component 814, and a communication component 816.

The processing component 802 generally controls the overall operations of the second device 800, such as operations associated with display, telephone calls, data communications, camera operations, and recording operations. The processing component 802 may include one or more processors 820 to execute instructions to complete all or part of the steps of the foregoing method. In addition, the processing component 802 may include one or more modules to facilitate the interaction between the processing component 802 and other components. For example, the processing component 802 may include a multimedia module to facilitate the interaction between the multimedia component 808 and the processing component 802.

The memory 804 is configured to store various types of data to support the operation of the second device 800. Examples of such data include instructions for any application or method operating on the second device 800, contact data, phone book data, messages, pictures, videos, etc. The memory 804 can be implemented by any type of volatile or non-volatile storage devices or their combination, such as static random access memory (SRAM), electrically erasable programmable read-only memory (EEPROM), Erasable Programmable Read Only Memory (EPROM), Programmable Read Only Memory (PROM), Read Only Memory (ROM), Magnetic Memory, Flash Memory, Magnetic Disk or Optical Disk.

The power supply component 806 provides power to various components of the second device 800. The power supply component 806 may include a power management system, one or more power supplies, and other components associated with generating, managing, and distributing power for the second device 800.

The multimedia component 808 includes a screen that provides an output interface between the second device 800 and users. In some embodiments, the screen may include a liquid crystal display (LCD) and a touch panel (TP). If the screen includes a touch panel, the screen may be implemented as a touch screen to receive input signals from the users. The touch panel includes one or more touch sensors to sense touch, sliding, and gestures on the touch panel. The touch sensor may not only sense the boundary of a touch or slide action, but also detect the duration and pressure related to the touch or slide operation. In some embodiments, the multimedia component 808 includes a front-facing camera and/or a rear-facing camera. When the second device 800 is in an operation mode, such as a shooting mode or a video mode, the front-facing camera and/or the rear-facing camera can receive external multimedia data. Each of the front-facing camera and the rear-facing camera can be a fixed optical lens system or have focal length and optical zoom capabilities.

The audio component 810 is configured to output and/or input audio signals. For example, the audio component 810 includes a microphone (MIC). When the second device 800 is in an operation mode, such as a call mode, a recording mode, and a voice recognition mode, the microphone is configured to receive an external audio signal. The received audio signal can be further stored in the memory 804 or sent via the communication component 816. In some embodiments, the audio component 810 further includes a speaker for outputting audio signals.

The I/O interface 812 provides an interface between the processing component 802 and a peripheral interface module. The above-mentioned peripheral interface module may be a keyboard, a click wheel, a button, and the like. These buttons may include but are not limited to: home button, volume button, start button, and lock button.

The sensor component 814 includes one or more sensors for providing the second device 800 with various aspects of state evaluation. For example, the sensor component 814 can detect the open/close state of the device 800 and the relative positioning of the components. For example, the components are the display and the keypad of the second device 800. The sensor component 814 can also detect the position change of the second device 800 or a component of the second device 800, the presence or absence of contact between the user and the second device 800, the orientation or acceleration/deceleration of the second device 800, and the temperature change of the second device 800. The sensor component 814 may include a proximity sensor configured to detect the presence of nearby objects when there is no physical contact. The sensor component 814 may also include a light sensor, such as a CMOS or CCD image sensor, for use in imaging applications. In some embodiments, the sensor component 814 may also include an acceleration sensor, a gyroscope sensor, a magnetic sensor, a pressure sensor, or a temperature sensor.

The communication component 816 is configured to facilitate wired or wireless communication between the second device 800 and other devices. The second device 800 can access a wireless network according to a communication standard, such as WIFI, 2 G, or 3 G, or a combination thereof. In some embodiments, the communication component 816 receives a broadcast signal or broadcast related information from an external broadcast management system via a broadcast channel. In some embodiments, the communication component 816 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In some embodiments, the second device 800 may be implemented by one or more application specific integrated circuits (ASIC), digital signal processors (DSP), digital signal processing equipment (DSPD), programmable logic devices (PLD), field programmable gate array (FPGA), controller, microcontroller, microprocessor, or other electronic component to implement the above method.

In some embodiments, there is also provided a non-transitory computer-readable storage medium including instructions, such as the memory 804 including instructions, which may be executed by the processor 820 of the second device 800 to perform the foregoing method. For example, the non-transitory computer-readable storage medium may be ROM, random access memory (RAM), CD-ROM, magnetic tape, floppy disk, optical data storage device, etc.

Figure 10:
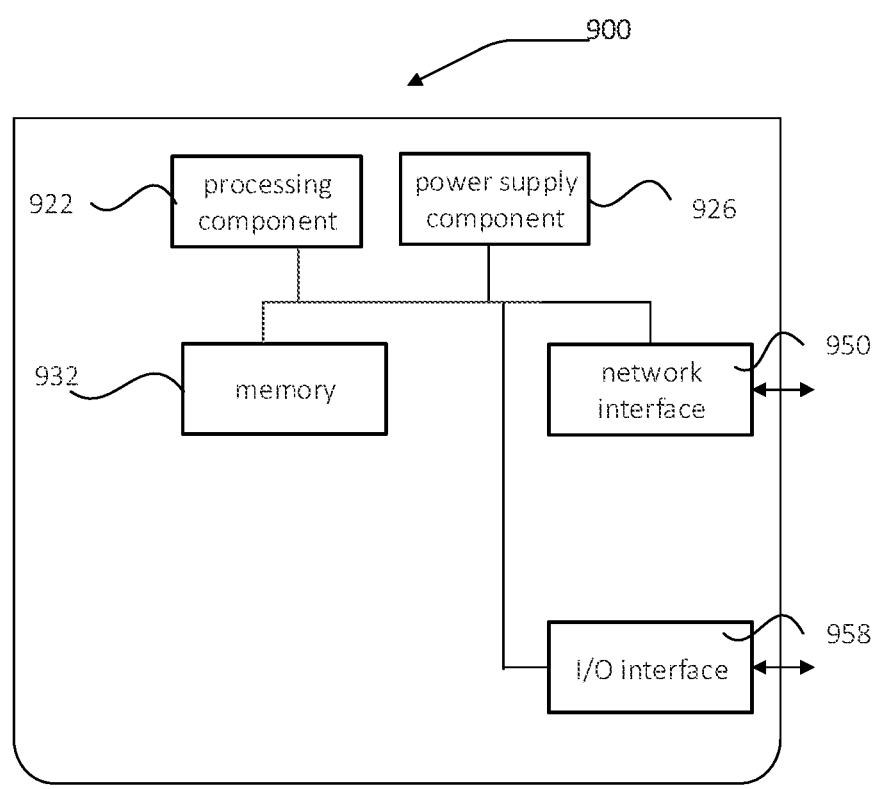
FIG. 10 is a schematic diagram illustrating a first device according to some embodiments.

As illustrated in FIG. 10, embodiments of the disclosure provide a structure of the first device. For example, the first device 400 may be provided as a network device. As illustrated in FIG. 10, the first device 900 includes a processing component 922, which further includes one or more processors, and memory resources represented by the memory 932 for storing instructions that can be executed by the processing component 922, such as application programs. The application programs stored in the memory 932 may include one or more modules each corresponding to a set of instructions. In addition, the processing component 922 is configured to execute instructions to perform the foregoing method executed by the first device such as the method illustrated in FIG. 3 and FIG. 6.

The first device 900 may also include a power supply component 926 configured to perform power management of the first device 900, a wired or wireless network interface 950 configured to connect the first device 900 to a network, and an input output (I/O) interface 958. The first device 900 can operate according to an operating system stored in the memory 932, such as Windows Server™, Mac OS X™, Unix™, Linux™, FreeBSD™ or the like.

In the technical solutions according to embodiments of the disclosure, the transmission parameters of the FMS streams of the plurality of transmission links are transmitted on one transmission link, so that the second device receives the transmission parameters related to the plurality of transmission links on one transmission link, instead of separately receiving the transmission parameter of the FMS stream related to each transmission link on the corresponding transmission link, thereby reducing the power consumption of the second device and prolonging the standby time of the second device.

Those skilled in the art will easily think of other embodiments of the disclosure after considering the specification and practicing the disclosure herein. This disclosure is intended to cover any variations, uses, or adaptive changes of the disclosure. These variations, uses, or adaptive changes follow the general principles of the disclosure. In addition, this disclosure includes common knowledge or conventional technical means in the technical field that are not disclosed in the disclosure. The description and embodiments are to be regarded as examples only, and the true scope and spirit of the disclosure are pointed out by the following claims.

It is understandable that the disclosure is not limited to the precise structure that has been described above and shown in the drawings, and various modifications and changes can be made without departing from its scope. The scope of the disclosure is only limited by the appended claims.

What is claimed is:

1. A wireless communication method, performed by a first device, the method comprising:
   sending a first message frame carrying a flexible multicast service (FMS) descriptor element on a transmission link, wherein the FMS descriptor element at least comprises transmission parameters for transmitting FMS streams on a plurality of transmission links,
   wherein the transmission parameters for transmitting the FMS streams on the plurality of transmission links at least comprise: link identifiers configured to identify the plurality of transmission links, and
   the FMS descriptor element further comprises at least one configuration parameter of at least one of the plurality of transmission links.

2. The method of claim 1, wherein each configuration parameter comprises at least one of:
   a field of FMS counters, configured to indicate a transmission period of an FMS stream;
   a field of numbers of FMS counters, configured to indicate a number of FMS counters;
   a field of FMS identifiers, comprising one or more FMS identifiers, wherein each FMS identifier is configured to identify a respective FMS stream; or
   a field of time offset, carrying time offsets indicating sending timing of beacon frames on the plurality of transmission links.

3. The method of claim 2, wherein the field of FMS counters is configured to indicate the transmission period of the FMS stream through a count of beacons received by a second device, and comprises at least one of:
   an FMS counter identifier (ID); or
   a current count.

4. The method of claim 1, wherein the FMS descriptor element further comprises:
   an element identifier, configured to indicate whether the FMS descriptor element comprises the transmission parameters for transmitting the FMS streams on the plurality of transmission links.

5. The method of claim 1, further comprising:
   receiving a second message frame, wherein the second message frame is configured to request a multi-link FMS descriptor element.

6. A non-transitory computer storage medium, having an executable program stored thereon, wherein when the executable program is executed by a processor, the method of claim 1 is performed.

7. A wireless communication method, performed by a second device, the method comprising:
   receiving a first message frame on a transmission link, wherein the first message frame carries a flexible multicast service (FMS) descriptor element, and the FMS descriptor element at least comprises transmission parameters for transmitting FMS streams on a plurality of transmission links,
   wherein the FMS descriptor element at least comprises: link identifiers configured to identify the plurality of transmission links, and
   the FMS descriptor element further comprises at least one configuration parameter of at least one of the plurality of transmission links.

8. The method of claim 7, further comprising:
   receiving, based on the first message frame, the FMS streams sent by a first device on the plurality of transmission links.

9. The method of claim 7, wherein each configuration parameter comprises at least one of:
   a field of FMS counters, configured to indicate a transmission period of an FMS stream;
   a field of numbers of FMS counters, configured to indicate a number of FMS counters;
   a field of FMS identifiers, comprising one or more FMS identifiers, each FMS identifier being configured to identify a respective FMS stream; or
   a field of time offset, carrying time offsets indicating sending timing of beacon frames on the plurality of transmission links.

10. The method of claim 9, wherein the field of FMS counters is configured to indicate the transmission period of the FMS stream through a count of beacons received by a second device and comprises at least one of:
    an FMS counter identifier (ID); or
    a current count.

11. The method of claim 7, wherein the FMS descriptor element further comprises:
    an element identifier, configured to indicate whether the FMS descriptor element comprises the transmission parameters for transmitting the FMS streams on the plurality of transmission links.

12. The method of claim 7, further comprising:
sending a second message frame configured to request the FMS descriptor element.

13. A communication device, comprising:
a processor;
a transceiver; and
a memory storing a program executable by the processor, wherein when the program is executed by the processor, the processor is configured to perform the method of claim 7.

14. A non-transitory computer storage medium, having an executable program stored thereon, wherein when the executable program is executed by a processor, the method of claim 7 is performed.

15. A communication device, comprising:
a processor;
a transceiver; and
a memory storing a program executable by the processor, wherein when the program is executed by the processor, the processor is configured to:
send a first message frame carrying a flexible multicast service (FMS) descriptor element on a transmission link, wherein the FMS descriptor element at least comprises transmission parameters for transmitting FMS streams on a plurality of transmission links,
wherein the transmission parameters for transmitting the FMS streams on the plurality of transmission links at least comprise: link identifiers configured to identify the plurality of transmission links, and
the FMS descriptor element further comprises at least one configuration parameter of at least one of the plurality of transmission links.

* * * * *